July 25, 1933.　　　　O. C. TRAVER　　　　1,919,969
PROTECTIVE APPARATUS
Filed Nov. 26, 1930　　　3 Sheets-Sheet 1

Inventor:
Oliver C. Traver:
by Charles E. Mullan
His Attorney,

Inventor:
Oliver C. Traver,
by Charles E. Tuller
His Attorney.

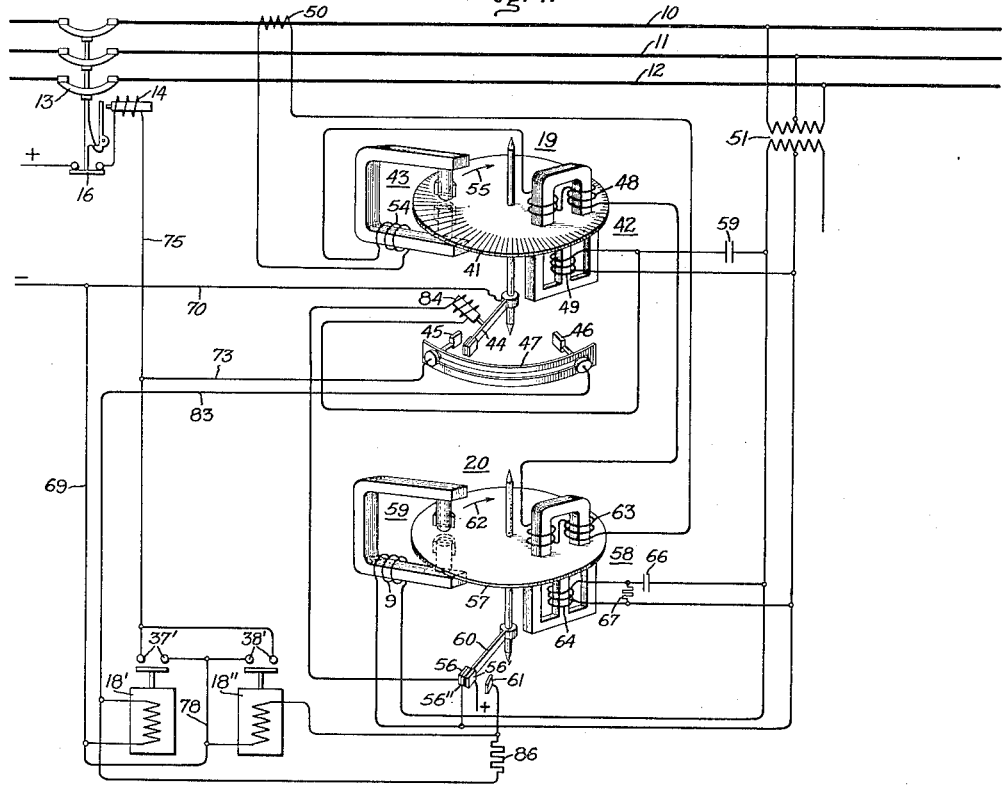

Patented July 25, 1933

1,919,969

UNITED STATES PATENT OFFICE

OLIVER C. TRAVER, OF DREXEL HILL, PENNSYLVANIA, ASSIGNOR TO GENERAL ELECTRIC COMPANY, A CORPORATION OF NEW YORK

PROTECTIVE APPARATUS

Application filed November 26, 1930. Serial No. 498,424.

My invention relates to improvements in protective apparatus for electric systems and more particularly to protective apparatus wherein selective action is obtained on a time basis dependent on the distance between the fault and the apparatus and an object of my invention is to provide improved protective apparatus of the so-called distance type whereby to obtain an improved time-distance operating characteristic and to insure quick operation for faults within a given range of distance so as to prevent system instability.

My invention will be better understood from the following description when considered in connection with the accompanying drawings and its scope will be pointed out in the appended claims.

Figure 1:
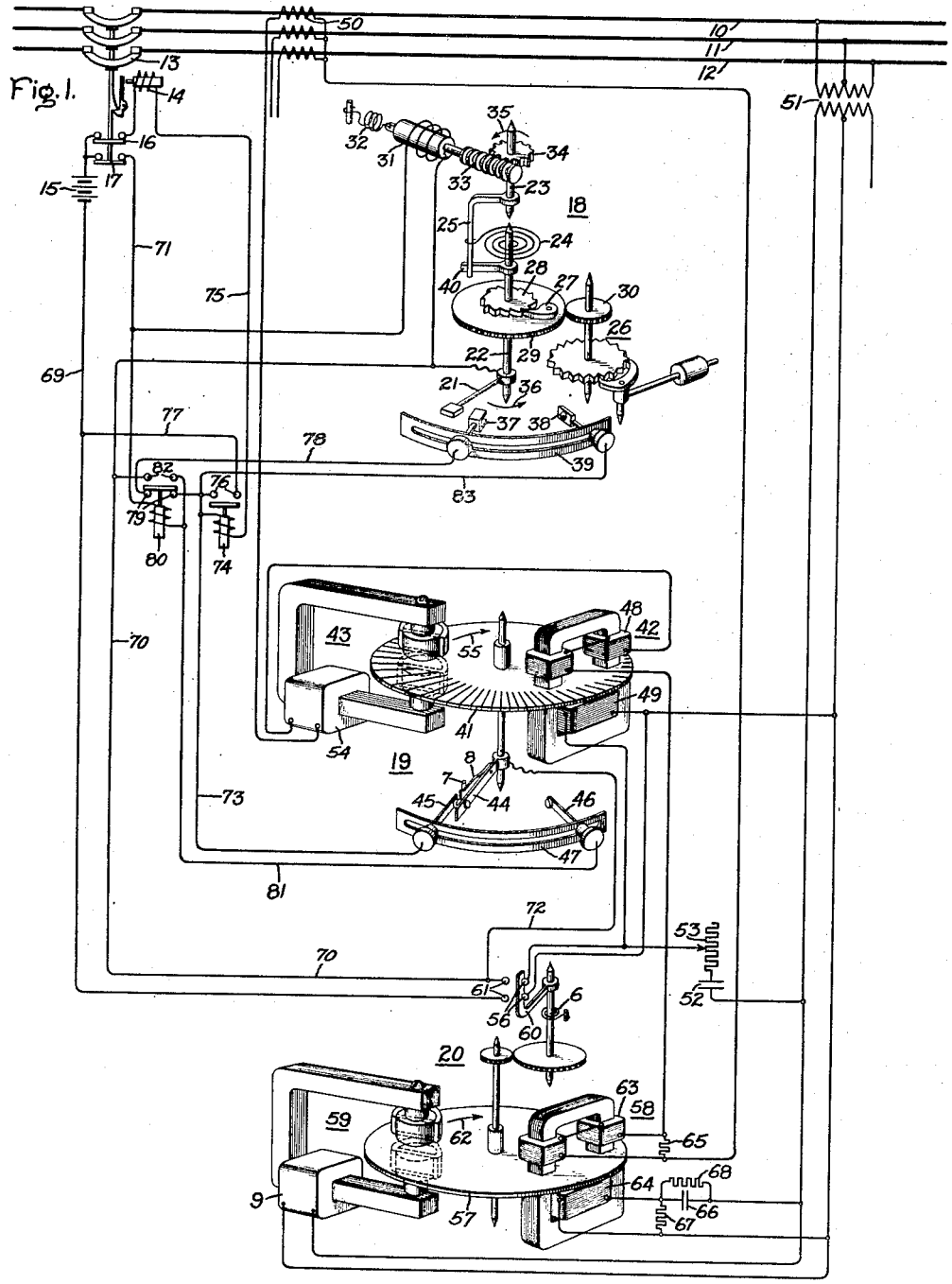
Figure 2:
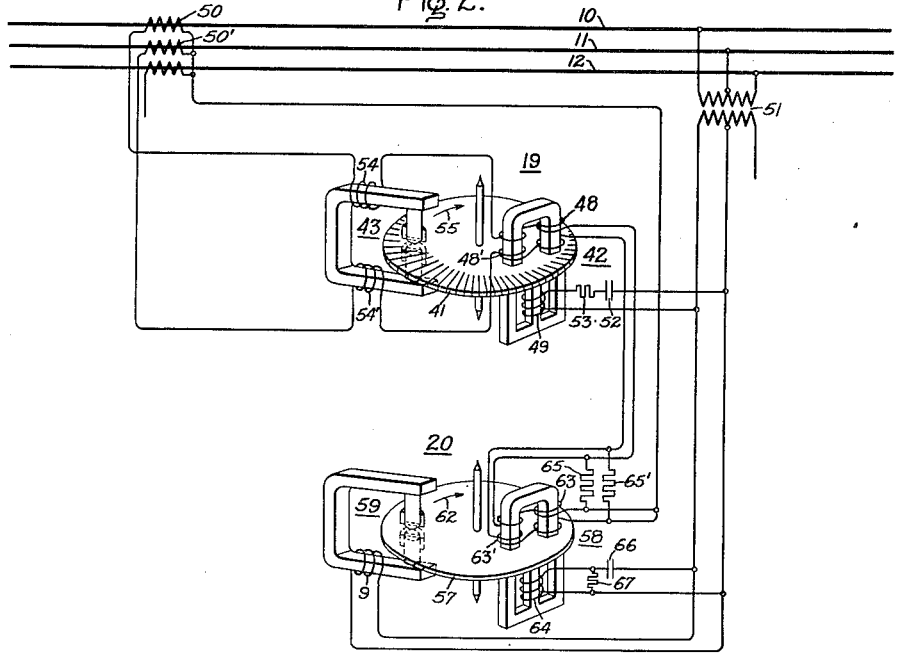
Figure 3:
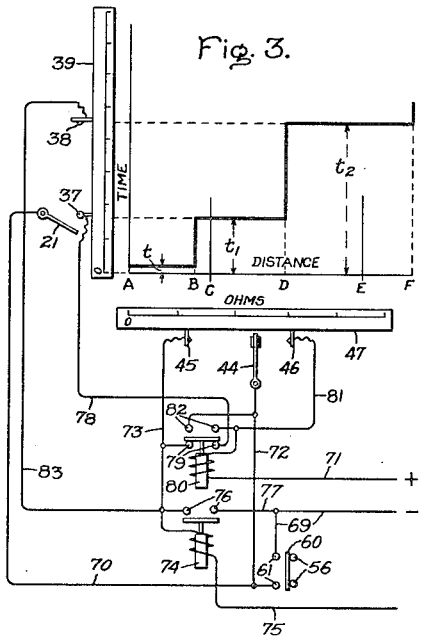

In the accompanying drawings, Fig. 1 illustrates schematically, partly in diagram and partly in perspective, an embodiment of my invention; Fig. 2 illustrates a modification of a part of the embodiment of my invention shown in Fig. 1; Fig. 3 is a combination characteristic and circuit control diagram explanatory of my invention; and Figs. 4 and 5 illustrate diagrammatically embodiments of my invention.

In Fig. 1, I have shown my invention as applied to the protection of a three-phase circuit having phase conductors 10, 11 and 12. This circuit is arranged to be controlled by suitable circuit interrupting means such as a circuit interrupter or breaker 13 of the latch closed type, the operation of which can be effected by the energization of its trip coil 14 from a suitable source such as the battery 15. The circuit breaker 13 may also be provided with auxiliary switches 16 and 17 for interrupting certain control circuits as will hereinafter appear. While I have shown only a portion of a three-phase circuit, it will be understood that this may form a part of an electric system. Also the circuit may be divided into sections by circuit breakers located at suitable points such as generating stations, substations, etc., as is well known to the art.

For controlling the circuit breaker 13 on the occurrence of a fault, such for example as a short-circuit between any two of the phase conductors 10, 11, 12, the embodiment of my invention shown in Fig. 1 includes a distance relay. In accordance with my invention, this relay comprises a plurality of cooperating means or units, which include a timing means 18, an ohmic means such as an ohmmeter 19 operable in accordance with an ohmic characteristic of the circuit 10, 11, 12, and a starting means 20 also operable in accordance with an ohmic characteristic of the circuit, and means controlled conjointly by the timing, ohmic and starting means for effecting the opening operation of the circuit breaker 13 in different definite times dependent on the location of the fault.

The timing means 18 may be of any suitable type and is preferably such as to require the minimum attention necessary to certainty of operation. For this reason I prefer a timing means whose energization is automatically controlled. Also in accordance with my invention, the timing means is preferably of a substantially constant speed type in order to obtain definite times. As shown, the timing means 18 is of the escapement type and includes a controlling member 21 which is secured to a shaft 22 and which is movable to a plurality of contact controlling positions. The shaft 22 is interconnected with a suitable actuating mechanism, which includes a shaft 23, through suitable energy storing means such as a spring 24 whose ends are secured respectively to the shaft 22 and to a crank 25 on the shaft 23. The shaft 22 is also interconnected with an escapement mechanism 26 through a pawl 27 and a ratchet 28 in order to insure a quick return of the movable member 21 independently of the escapement mechanism.

The ratchet 28 is secured to the shaft 22 and engages the pawl 27 which is carried by a gear 29 loosely mounted on the shaft 22 and engaging the pinion 30 of the escapement mechanism 26.

For automatically winding or storing energy in the spring 24 in response to the desired condition, I provide an electromagnetic motor mechanism 31 which when energized overcomes the bias of a return spring 32 and through the rack 33 and pinion 34 turns the arm 25 in the direction indicated by the arrow 35. As the energy thus quickly stored in the spring 24 is slowly dissipated by reason of the escapement mechanism 26, the member 21 is moved in the direction indicated by the arrow 36. For the desired contact controlling operation, the path of movement of the member 21 includes one or more contacts 37, 38 which may be adjustably positioned on a suitably graduated time scale 39 as shown. When the electromagnetic motor means 31 is deenergized, the crank 25, under the bias of the spring 32, is quickly turned in a direction opposite that indicated by the arrow 35. In this direction of movement the crank 25 engages an arm 40 on the shaft 22 and, since this shaft can turn in such direction independently of the escapement 26, the member 21 is quickly restored to its initial position, the return motion being limited by the travel of the rack 33 or the plunger of the electromagnet 31 coupled thereto.

The ohmic unit or ohmmeter 19 may be of any suitable type, but that which I have chosen to illustrate my invention, is of the induction disk type and includes a movable member such as the slotted disk 41 which is constructed and arranged to take a position dependent on an ohmic characteristic such as the impedance, resistance or reactance of the circuit 10, 11, 12, or a portion thereof. In some applications of my invention, I prefer to use the reactance of the circuit. For this purpose, I may provide, as shown, two cooperating electromagnetic motor elements 42 and 43 which are respectively directional and non-directional and whose torques are respectively proportional to $EI \sin \phi$ and $I^2$, $E$ and $I$ respectively being a voltage of the circuit and the current in a phase conductor of the circuit and $\phi$ the phase angle between them. When these torques are opposed, the disk 41 because of its slotting comes to a position of equilibrium. The deflection of the disk, that is its movement from an initial position, is therefore proportional to $$\frac{EI \sin \phi}{I^2} = \frac{E}{I} \sin \phi = Z \sin \phi = X,$$

$Z$ and $X$ being respectively the impedance and reactance of the part of the circuit in question. Associated with the disk 41 so as to be movable therewith is a controlling member 44 in the path of movement of which one or more contacts 45 and 46 are arranged. These may be adjustably positioned on a suitably graduated ohmic or distance scale 47 as shown. Permanent drag magnets, not shown, may be employed to steady the disk 41.

The motor element 42 is of the wattmetric type and includes cooperating current and voltage windings 48 and 49 respectively which are respectively connected to be energized in accordance with the current in the phase conductor 10 and the voltage between the phase conductors 10 and 11 by suitable means such as a current transformer 50 and a potential transformer 51. In order to obtain the desired phase relation between the currents in the windings 48 and 49, suitable phase displacing means such as the condenser 52 is provided. A variable resistance 53 connected in series with the voltage winding 49 may be employed to adjust the torque of the wattmetric element 42.

The motor element 43 may be of the shaded pole non-directional type, as shown, and has its main winding 54 connected to be energized in accordance with the current in the phase conductor 10. The torque exerted by this current element is in the direction indicated by the arrow 55 and under predetermined circuit conditions is opposed by the torque of the element 42. The nature of the protection desired will, of course, govern but the torques of the elements 42 and 43 may be opposed when, with power factor leading, the power is in one direction and when, with power factor lagging, the power is in the reverse direction.

In order to obtain quick operation for nearby faults, I may so control the ohmmeter 19 that its contact controlling member 44 is normally maintained in the position of minimum ohms where it is held by the torque of the current operated element 43 with the member 44 engaging the contact 45. For this purpose, I can arrange to have the motor element 42 rendered normally inoperative in any suitable manner as for example by short-circuiting its high impedance voltage winding through contacts 56 controlled by the starting unit 20, although, if so desired, these contacts could short-circuit the condenser 52 and the resistance 53. This also eliminates unnecessary heating of the voltage winding besides reducing the normal burden on the potential transformer 51.

The starting unit 20 may be of any suitable type, but that which I have chosen to illustrate my invention is of the induction disk type and includes a movable member such as the disk 57 which is constructed and arranged to take a controlling position dependent on an ohmic characteristic of the circuit 10, 11, 12, or a portion thereof, such as the impedance or a component of the impedance in the direction of the resistance or reactance axes or some axis at an angle $\alpha$ to the resistance axis. In some applications of my invention, I prefer to use the impedance component at the angle α. For this purpose, I may provide, as shown, two cooperating electromagnetic motor elements 58 and 59 which are respectively directional and non-directional and whose torques are respectively proportional to EI cos $(\phi+\alpha)$ and $E^2$, E and I respectively being a voltage of the circuit and the current in a phase conductor of the circuit, $\phi$ the phase angle between them and α an angle whose value is determined in accordance with the particular operation desired. Associated with the disk 57 so as to be movable therewith is a controlling member 60 in the path of movement of which are arranged the contacts 56 and also contacts 61. In order to insure a quick opening of the contacts 56 and a quick closing of the contacts 61, the member 60 may be of a resilient character so that it is normally stressed by the resultant torque of the elements 58 and 59 and tends to move under such stress from contacts 56 to contacts 61. Permanent drag magnets, not shown, may be used to steady the disk 57. In order to prevent unnecessary tripping, the member 60 may be biased away from contacts 61 by a light spring 6.

The restraining motor element 59 may be of the shaded pole non-directional type, as shown, and has its main winding 9 connected to be energized in accordance with the voltage between the phase conductors 10 and 11. The torque exerted by the voltage element is in the direction indicated by the arrow 62, that is in a direction to move the controlling member 60 to close the contacts 56.

The operating motor element 58 is of the power directional wattmetric type and includes cooperating current and voltage windings 63 and 64 respectively which are respectively connected to be energized in accordance with the current in the phase conductor 10 and the voltage between the phase conductors 10 and 11. In order to obtain the desired phase relation between the currents in the windings, suitable phase displacing means, such as the resistance 65 in parallel with the current winding 63, may be provided.

In order to obtain a high degree of sensitivity in the starting unit, particularly on low impedance faults, I may connect in series with the voltage winding 64 a condenser 66 forming therewith a series-resonant circuit at the operating frequency of the circuit 10, 11, 12, and across the winding 64, a resistance 67 of the type having a volt-ampere characteristic $I=KE^n$ without time lag, where I and E represent respectively the current in and the voltage across the resistance, K a constant and n an exponent greater than 1. Thus at high voltage, for example normal voltage, the resistance 67 is comparatively low and in effect by-passes the winding 64 but at low voltage the resistance 67 is very high and the maximum current flow occurs in the circuit of the winding 64 and the condenser 66 due to resonance. It will be obvious that at normal voltage, the current drawn by the voltage circuit of the motor element 58 is highly leading and tends to neutralize the lagging burden imposed by the other voltage devices. Where it is desired to lag the angle of maximum torque more with increasing voltage, a resistance 68 similar to the resistance 67 may be connected across the condenser 66.

With power flow in the circuit 10, 11, 12, in a given direction, for example towards the bus of the station where the relay is located, the torques of the motor elements 58 and 59 are cumulative and tend to maintain the contacts 56 closed. Upon the occurrence of a fault causing power flow in the opposite direction, that is away from the bus, these torques are opposed and, when the torque of the power directional element 58 predominates, the contacts 56 are opened and the contacts 61 closed if the fault is within the maximum distance AF, see Fig. 3, for which opening operation of the circuit breaker 13 is desired. This renders the ohmmeter 19 operative by removing the short-circuit from its potential winding 49. The closing of the contacts 61 completes the circuit of the motor mechanism 31 of the timing means 18 from one side of the battery 15 to the other as follows: conductor 69, contacts 61, conductor 70, winding of mechanism 31, conductor 71, and auxiliary switch 17 thereby starting the timing means.

It will first be assumed that the fault is within the range of the minimum ohm setting of the ohmmeter 19 or somewhere between the circuit breaker location A and a point B to the left of a station C, see Fig. 3. Under these conditions the controlling member 44 of the ohmmeter engages the contact 45 and the circuit breaker 13 is tripped in the minimum time $t$, that is the time it takes the starting means 20 to operate. The circuit of the trip coil 14 is completed from one side of the battery 15 to the other as follows: conductor 69, contacts 61, conductor 72, controlling member 44, contact 45, conductor 73, winding of the auxiliary relay 74, conductor 75, trip coil 14 and auxiliary switch 16. The auxiliary relay 74 upon energization closes its contacts 76 and takes over the work of the other relay contacts to insure positive tripping regardless of any possible contact flutter. The trip circuit is then conductors 69 and 77, contacts 76, winding of auxiliary relay 74, conductor 75, trip coil 14 and auxiliary switch 16.

It will now be assumed that the fault is within the range of a higher ohm setting of the ohmmeter 19 or somewhere between B and a point D to the left of station E, see Fig. 3. Under these conditions, the controlling member 44 of the ohmmeter 19 quickly takes a position intermediate the contacts 45 and 46. After a predetermined definite time $t_1$, however, the controlling member 21 of the timing means 18 engages the contact 37. This completes the circuit of the trip coil 14 from one side of the battery 15 to the other as follows: conductor 69, contacts 61, conductor 70, controlling member 21, contact 37, conductor 78, contacts 79 of a transfer relay 80, winding of auxiliary relay 74, conductor 75, coil 14, and auxiliary switch 16. As before, the auxiliary relay 74 is energized and seals itself in to hold the trip coil circuit until the circuit breaker 13 opens.

It will now be assumed that the fault is within the range of a still higher ohm setting of the ohmmeter 19 or somewhere between D and a point F to the right of station E, see Fig. 3. Under these conditions, the controlling member 44 of the ohmmeter engages the contact 46 thereby completing the circuit of the winding of the transfer relay 80 from one side of the battery 15 to the other as follows: conductor 69, contacts 61, conductor 72, controlling member 44, contact 46, conductor 81, winding of the transfer relay 80, conductor 71, and auxiliary switch 17. Upon energization, the transfer relay 80 opens its contacts 79 and closes its contacts 82. Opening of the contacts 79 prevents the closing of the trip coil circuit by the control member 21 of the timing means when it engages its cooperating contact 37. After a predetermined definite times $t_2$, however, the controlling member 21 of the timing means 18 engages the contact 38 and the circuit of the trip coil 14 is completed from one side of the battery 15 to the other as follows: conductor 69, contacts 61, conductor 70, controlling member 21, contact 38, conductor 83, winding of the auxiliary relay 74, conductor 75, coil 14, and auxiliary switch 16. As before, the auxiliary relay 74, upon energization, seals itself in to maintain the trip coil circuit until the circuit breaker 13 opens.

Thus, for faults which occur within the range of the distance AF and which cause a reversal of power, the circuit breaker 13 will be tripped in different definite times $t$, $t_1$, $t_2$, corresponding to the distance ranges AB, BD, DF. The distance AF may represent the maximum impedance for which the starting unit will function so that for faults outside of the range AF no tripping will occur. While I have shown in Fig. 1 a distance relay, embodying my invention, for only one phase, it will be understood that a similar relay may be provided for each of the other phases.

In order to prevent instantaneous tripping on current below a predetermined value, I may provide suitable means for keeping the ohmmeter controlling member 44 away from contact 45 when the current is below this value. As shown, this means includes a leaf-type spring 8 secured to the member 44 and abutting a stop 7. When current is above a predetermined value, the spring 8 is stressed to permit the member 44 to engage the contact 45 but when current falls below this value, the spring separates the contacts 44 and 45. This spring action has an additional advantage, particularly in case of faults whose reactance is just above the minimum operating time value, in that it accelerates the separation of the contacts 44 and 45 and thereby gives a better discrimination between the ohm ranges corresponding to instantaneous and intermediate tripping times.

In order to obtain more uniform responsiveness, particularly with reference to the operation of the ohmic means 19 and 20 for line to line or single-phase and three-phase faults, I may use the modification of my invention shown in Fig. 2. This modification also makes available, without the necessity of additional current transformers, a residual current circuit which is desirable for line protective schemes in connection with ground faults.

In the modification of my invention shown in Fig. 2, I have illustrated merely the ohmmeter 19 and the starting means 20 since they are the parts subject to change. This change consists in energizing the current magnetic portion of the motor elements 42, 43 and 58 in accordance with the difference between the currents in two phase conductors, the voltage between which is used to energize the voltage magnetic portions of the motor elements 42, 58 and 59. This current difference energization may be obtained by providing the current magnetic portions of the motor elements 42, 43 and 58 with double windings 48, 48'; 54, 54'; and 63, 63' respectively, so connected and arranged as to produce in each of these magnetic portions a flux dependent on the difference between the currents in the conductors 10 and 11. On the occurrence of a short-circuit between these conductors assuming an equal number of turns in the corresponding sections of the coils, there appears a flux proportional to the sum of the fault currents in these two conductors since these two currents are displaced 180°. Thus, for example, windings 48, 54 and 63 may be connected in circuit with the current transformer 50 and the windings 48', 54' and 63' in circuit with the current transformer 50'. With this arrangement, the movable members controlled by the ohmic responsive means 19 and 20 will have the same degree of responsiveness or travel irrespective of whether a fault at any given location involves two phase conductors or all three phase conductors. While I have shown in Fig. 2 a distance relay, embodying my invention, for only one phase, it will be understood that a similar relay may be provided for each of the other phases.

In the embodiment of my invention shown in Fig. 4, two different definite times, $t_1$ and $t_2$ are obtained by separate timing elements 18' and 18" respectively. These may be of the escapement type shown in Fig. 1. A controlling member 60 of the starting means 20 is provided with two insulated contacts 56, 56'. The controlling member 44 of the ohmmeter 19 may be maintained in a higher ohm position than that of contact 45 by any suitable means herein shown as a solenoid 84 which may be normally connected to be energized in accordance with the circuit voltage through the contacts 56, 56" of the starting means 20 or the contact 61 of the starting relay may be connected in series with the contact 45 of the ohmmeter 19 as shown in Fig. 1. In the latter case, the time for contact to be made at contact 61 will be made sufficiently great to permit contact to be broken invariably at contact 45 if the fault is of higher ohmic value than indicated by the position of contact 45. The circuit of the solenoid 84 is across the voltage winding 49 of the ohmmeter 19 and is, in effect, when the contacts 56, 56" are closed, a short-circuit across this winding.

In case of a fault with power flow in a given direction, a starting relay 20 opens its contacts 56', 56" thereby deenergizing the solenoid 84 and starting the ohmmeter 19 into operation. If the fault is within the minimum ohm range, the contact 45 is quickly engaged by the controlling member 44. This completes the trip coil circuit as follows: from plus, through auxiliary switch 16, trip coil 14, conductors 75 and 73, contacts 45 and 44 and conductor 70 to minus.

When the contacts 56' and 61 engage, they start the timing means 18', 18" into operation. If the fault is within the intermediate ohm range, then at the end of the time $t_1$ corresponding to this range when the controlling member 44 is intermediate contacts 45 and 46, the timer 18' closes contacts 37'. This completes the trip coil circuit from plus, through auxiliary switch 16, trip coil 14, conductor 75, contacts 37' and conductors 78 and 69 to minus. If the fault is beyond the intermediate ohm range but within the maximum ohm range, the timer 18' is rendered inoperative when the controlling member 44 engages the contact 46 and thereby short-circuits the timer 18' through conductor 70, contacts 44 and 46, and conductor 83. In order to avoid a short circuit on the timer energizing source under these conditions, there may be provided protective resistance 86 in series with the contacts 61 and 56'. At the end of the time $t_2$, however, the timer 18" closes its contacts 38' thereby completing the trip coil circuit from plus, through auxiliary switch 16 to coil 14, conductor 75, contacts 38' and conductors 78 and 69 to minus.

In the embodiment of my invention shown in Fig. 5, the starting and ohmic functions are combined in a single directional ohmic means 19' whose motor elements 59 and 58 are respectively responsive to the voltage and the power of the circuit. With power in a given direction, the controlling member 85 is urged in the direction indicated by the arrow 55 to hold the contacts 87 open. These contacts are in the circuit of the timing means 18 which is consequently normally inoperative. The timing means may be similar to that illustrated in Fig. 1. The voltage element 59 tends to increase the ohmic indication while the power element 58 tends to decrease the ohmic indication with power in the direction to trip so that with power flow in the opposite direction, the controlling member 85 moves in a direction opposite to that indicated by the arrow 55.

In case of a fault with power flow in the direction for which circuit breaker operation is desired, the controlling member 85 quickly engages contact 88 if the fault is within the minimum ohmic range. This completes the circuit of a self-sealing transfer relay 74 which is in series with the trip coil 14 through conductor 75. This relay when energized seals itself through its contacts 76 and maintains the trip coil circuit from minus through contacts 76, transfer relay 74, conductor 75, trip coil 14 and auxiliary switch 16 to plus.

If the fault is within the intermediate ohmic range, then controlling member 85 engages contact 89 thereby completing the circuit of an auxiliary relay 90 which through its contacts 91 seals itself and connects the minus side of the control source, not shown, to the intermediate contact 37 of the timing means 18. Thus, when the controlling member 21 engages contact 37 in the time $t_1$, it completes the circuit of the transfer relay 74 to conductors 92 and 75 and thereby effects the tripping of the circuit breaker 13.

If the fault is beyond the intermediate ohmic range but within the maximum ohmic range, the controlling member 85 does not move sufficiently to engage contact 89. In this case the timer 18 proceeds to close its contact 38, in the time $t_2$, thereby energizing the trip coil 14 and the transfer relay 74 which seals itself and maintains the trip circuit until interruption of the auxiliary switch 16. If the fault is beyond the maximum ohmic range for which operation is desired, the controlling member 85 will not move sufficiently to permit the closing of contacts 87 and consequently no relay operation will take place.

While I have shown and described my invention in considerable detail, I do not desire to be limited to the exact arrangements shown but seek to cover in the appended claims all those modifications that fall within the true spirit and scope of my invention.

What I claim as new and desire to secure by Letters Patent of the United States, is:

1. In combination, an electric circuit, a circuit interrupter and controlling means therefor including timing means, ohmic operable in accordance with an ohmic characteristic of the circuit, power directional starting means operable in accordance with an ohmic characteristic of the circuit and means controlled conjointly by said timing means, said ohmic means and said starting means for effecting the circuit opening operation of said interrupter in a time dependent on the location of a fault with power flow in a given direction.

2. In combination, an electric circuit, a circuit interrupter and controlling means therefor including normally deenergized timing means, ohmic means operable in accordance with an ohmic characteristic of the circuit including a normally inoperative directional operating element connected for energization in accordance with the power of the circuit, starting means operable in accordance with an ohmic characteristic of the circuit for rendering said directional operating element operative and for energizing said timing means on the occurrence of abnormal circuit conditions, and means controlled conjointly by said timing means, said ohmic means and said starting means for effecting the circuit opening operation of said interrupter in times dependent on the location of a fault with power flow in a given direction.

3. In combination, an electric circuit, a circuit interrupter, and controlling means therefor including timing means, ohmic means, operable in accordance with an ohmic characteristic of said circuit, power directional starting means operable in accordance with an ohmic characteristic of said circuit and means controlled conjointly by said timing means, said ohmic means and said starting means for effecting the circuit opening operation of said interrupter in different definite times corresponding to fault occurrences within different predetermined portions of said circuit.

4. A distance relay including timing means, an ohmmeter having a movable member and actuating means therefor including directional and non-directional cooperating electromagnetic motor elements, an ohmmetric starting means having a movable member and actuating means therefor including directional and non-directional cooperating electromagnetic motor elements, means for rendering the directional motor element of the ohmmeter inoperative when the member of the starting means is in one position and for effecting the operation of the timing means when in another position.

5. In combination, an electric circuit, a circuit interrupter and controlling means therefor including normally inoperative substantially constant speed timing means, a directional ohmmeter operable in accordance with the reactance of the circuit, a directional starting means operable in accordance with a component of the impedance of the circuit, means controlled by said starting means for effecting the operation of said timing means and said ohmmeter when power flow in the circuit is in a given direction and means controlled conjointly by said timing means, said ohmmeter and said starting means for effecting the circuit opening operation of said interrupter in different definite times corresponding to fault occurrences within different predetermined portions of said circuit.

6. A distance relay including normally deenergized timing means and an ohmmeter having a movable member and actuating means therefor including two cooperating electromagnetic elements, an ohmmetric starting means having a movable member and actuating means therefor including two cooperating electromagnetic elements and means for rendering one of the ohmmeter electromagnetic elements inoperative when the member of the starting means is in one position and for controlling the energization of the timing means when in another position.

7. In combination, an electric circuit, a circuit interrupter and controlling means therefor including normally deenergized timing means, ohmic means operable in accordance with an ohmic characteristic of the circuit including a normally inoperative directional operating element connected for energization in accordance with the power of the circuit, and starting means operable in accordance with an ohmic characteristic of the circuit for rendering said operating element operative and for energizing said timing means on the occurrence of abnormal circuit conditions.

8. A distance relay including normally deenergized timing means, an ohmmeter having a movable member and actuating means therefor including two cooperating electromagnetic elements, an ohmmetric starting means having a movable member and actuating means therefor including two cooperating electromagnetic elements and means for rendering one of the ohmmeter electromagnetic elements inoperative when the member of the starting means is in one position and for controlling the energization of the timing means when in another position and means controlled conjointly by said starting means when the member thereof is in said other position and the member of the ohmmeter is in a predetermined position.

9. In combination, an electric circuit, a circuit interrupter, and controlling means therefor including normally inoperative timing means having contacts operable in different definite times, power directional ohmmetric means connected to be energized from said circuit for rendering said timing means operative for ohms below a predetermined value, means controlled by said ohmmetric means for quickly effecting the opening of said circuit interrupter for ohms less than a smaller predetermined value and means controlled conjointly by said ohmmetric means and said timing means for effecting the opening of said interrupter in different definite times corresponding to successive ohmic ranges between said predetermined values.

10. In combination, an electric circuit, a circuit interrupter, controlling means therefor including timing means having a plurality of contacts closable in different times, ohmic means having a member operable to a plurality of controlling positions in accordance with an ohmic characteristic of the circuit, starting means having a member operable in accordance with an ohmic characteristic of the circuit to one of a plurality of controlling positions for normally rendering said ohmic means inoperative and to another of said controlling positions for quickly effecting the opening of said interrupter conjointly with the member of the ohmic means when this member is in one of its controlling positions and for effecting a time delayed opening of said interrupter when the member of said ohmic means takes a controlling position intermediate said one controlling position and another controlling position and one of the contacts of said timing means closes, and means controlled conjointly by said starting means and said ohmic means when the member thereof takes said other controlling position for preventing the opening of said interrupter until another contact of the timing means closes.

11. In combination, an electric circuit, a circuit interrupter, controlling means therefor including normally deenergized timing means having contacts closable in different times, ohmic means including an operating element connected for energization in accordance with the power of the circuit, a member operable to a plurality of different controlling positions in accordance with an ohmic characteristic of the circuit and a restraining element for normally maintaining said member in one of said controlling positions, starting means including an operating element connected to be energized in accordance with the power of the circuit, a restraining element connected to be energized in accordance with a voltage of the circuit and a member controlled by said starting means for controlling the energization of said timing means, for normally rendering the operating element of the ohmic means inoperative and for quickly effecting the opening of said interrupter conjointly with the member of the ohmic means when this member is maintained in said one position, the member of said starting means cooperating with one of the contacts of the timing means to effect a time delayed opening of said interrupter when the member of the ohmic means takes a position intermediate said one controlling position and another controlling position and means controlled cojointly by said starting means and said ohmic means when the member of the ohmic means takes said other controlling position for preventing the opening of said interrupter until another of the contacts of the timing means closes.

OLIVER C. TRAVER.